(12) United States Patent
Sugita et al.

(10) Patent No.: US 12,076,813 B2
(45) Date of Patent: Sep. 3, 2024

(54) METHOD FOR DECORATING WATCH COMPONENT, WATCH COMPONENT, WATCH MOVEMENT, AND WATCH

(71) Applicant: Seiko Epson Corporation, Tokyo (JP)

(72) Inventors: Atsuhiko Sugita, Suwa (JP); Ai Yoshinaga, Shiojiri (JP); Yuki Takishita, Shiojjiri (JP); Wataru Uehara, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 595 days.

(21) Appl. No.: 17/361,439

(22) Filed: Jun. 29, 2021

(65) Prior Publication Data

US 2021/0402513 A1 Dec. 30, 2021

(30) Foreign Application Priority Data

Jun. 30, 2020 (JP) ................. 2020-112532

(51) Int. Cl.
*B23K 26/082* (2014.01)
*B23K 26/0622* (2014.01)
*B44C 1/22* (2006.01)
*G04D 3/00* (2006.01)

(52) U.S. Cl.
CPC ........ *B23K 26/0624* (2015.10); *B23K 26/082* (2015.10); *B44C 1/228* (2013.01); *G04D 3/0069* (2013.01)

(58) Field of Classification Search
None
See application file for complete search history.

(56) References Cited

U.S. PATENT DOCUMENTS

| | | | |
|---|---|---|---|
| 10,613,306 B2 * | 4/2020 | Vasylyev | H01L 31/054 |
| 10,649,406 B2 * | 5/2020 | Noirot | G04B 19/12 |
| 11,033,984 B2 * | 6/2021 | Russell-Clarke | B32B 3/263 |
| 2002/0088780 A1 | 7/2002 | Boyle et al. | |
| 2015/0049593 A1 | 2/2015 | Oliveira | |
| 2016/0263698 A1 | 9/2016 | Noirot et al. | |
| 2020/0086678 A1 | 3/2020 | Bienvenu et al. | |

FOREIGN PATENT DOCUMENTS

| | | |
|---|---|---|
| JP | H11-300881 A | 11/1999 |
| JP | 2003-001442 A | 1/2003 |
| JP | 2004-512690 A | 4/2004 |
| JP | 2015-514582 A | 5/2015 |
| JP | 2016-183961 A | 10/2016 |
| JP | 2018-501115 A | 1/2018 |
| JP | 2019-060716 A | 4/2019 |
| JP | 2020-076740 A | 5/2020 |

* cited by examiner

*Primary Examiner* — Daniel J. Schleis
(74) *Attorney, Agent, or Firm* — Harness, Dickey & Pierce, P.L.C.

(57) ABSTRACT

A method for decorating a dial includes deeply digging and forming a first groove by repeatedly scanning, in a predetermined scanning direction, a place where laser light is applied to a base material. In the scanning, a depth of the first groove is controlled by the number of irradiation times that the laser light is applied. An area where a depth of the first groove is shallow and an area where a depth of the first groove is deep are present according to the number of irradiation times.

10 Claims, 14 Drawing Sheets

| MATERIAL | POWER IN TARGET (W) | AVERAGE DIAMETER OF BEAM AT TARGET (μm) | REPETITION FREQUENCY (kHz) | SCANNING STRATEGY | SCANNING PITCH (mm) | SCANNING SPEED (mm/s) | PULSE INTERVAL (μm) | TARGET DEPTH AT WHICH LIGHTNESS IS EQUAL TO OR LESS THAN 20 (μm) |
|---|---|---|---|---|---|---|---|---|
| BRASS | 13 | 25 | 1700 | CROSS HATCHING | 0.035 | 1000 | 0.59 | 50 |
| PURE IRON | 9.6 | 25 | 2000 | CROSS HATCHING | 0.035 | 1000 | 0.5 | 50 |
| SUS | 8.2 | 25 | 1400 | CROSS HATCHING | 0.035 | 1000 | 0.71 | 50 |
| NICKEL SILVER | 10.4 | 25 | 1750 | CROSS HATCHING | 0.035 | 1000 | 0.57 | 50 |

FIG. 20

METHOD FOR DECORATING WATCH COMPONENT, WATCH COMPONENT, WATCH MOVEMENT, AND WATCH

The present application is based on, and claims priority from JP Application Serial Number 2020-112532, filed Jun. 30, 2020, the disclosure of which is hereby incorporated by reference herein in its entirety.

BACKGROUND

1. Technical Field

The present disclosure relates to a method for decorating a watch component, a watch component, a watch movement, and a watch.

2. Related Art

JT-2015-514582 discloses a method for forming a pattern on a surface of a member by irradiating a member such as steel, titanium, ceramic, ruby, and sapphire with laser light. According to the method, the member is irradiated with femtosecond laser emitting a pulse of a duration of 450 fs. A place irradiated with the laser light is colored in black, and the place irradiated with the laser light and a place without irradiation have different reflectances of a front surface. A character and a mark are formed by irradiating a predetermined portion of the member with the laser light.

In the method disclosed in JP-T-2015-514582, a difference in intensity of reflected light between a place irradiated with laser light and a place without irradiation is clear. However, only monotonous contrast representation can be achieved, and thus it is difficult to enhance design of a watch component.

SUMMARY

A method for decorating a watch component made of metal includes forming a groove by advancing, in a predetermined scanning direction, a place where laser light is applied in the watch component, where, a depth of the groove is controlled by the number of irradiation times that the laser light is applied, and the number of irradiation times in an area where a depth of the groove is deep is greater than the number of irradiation times in an area where a depth of the groove is shallow.

A watch component includes a plurality of grooves formed by laser light on a metal base material, where the grooves have an area where a depth of the groove is shallow and an area where a depth of the groove is deep, and $0<B\leq 6\times A$, wherein a width of the groove is A and a depth of the groove is B.

A watch movement includes the watch component described above.

A watch includes the watch component described above.

BRIEF DESCRIPTION OF THE DRAWINGS

FIG. 20 is a diagram for illustrating a laser irradiation condition according to a seventh exemplary embodiment.

DESCRIPTION OF EXEMPLARY EMBODIMENTS

First Exemplary Embodiment

Figure 1:
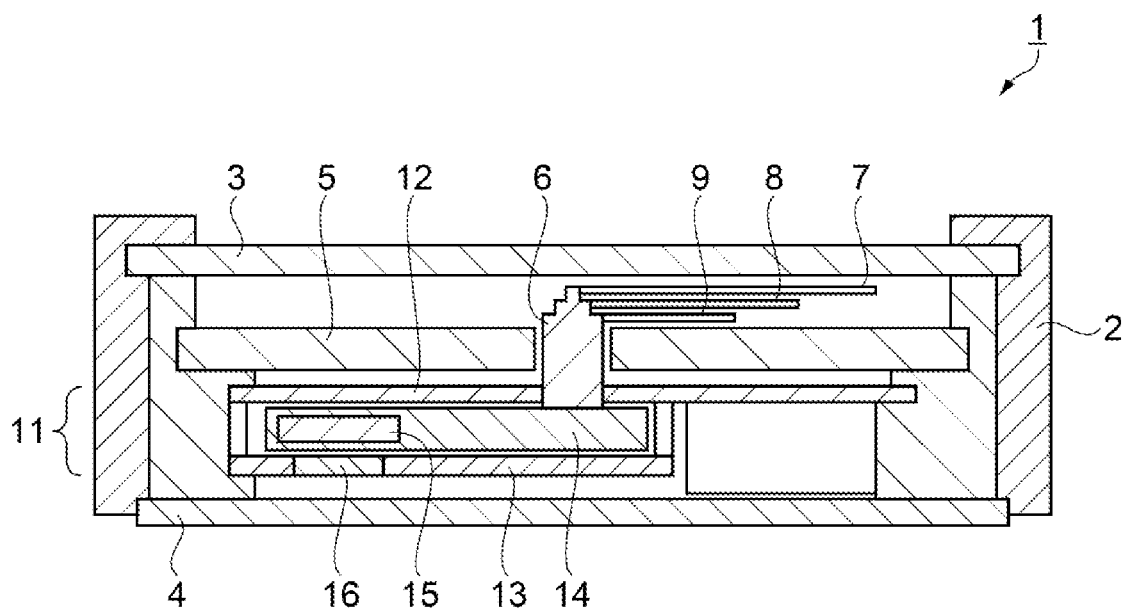
FIG. 1 is a schematic side cross-sectional view illustrating a configuration of a watch according to a first exemplary embodiment.

As illustrated in FIG. 1, a watch 1 includes an outer case 2 having a cylindrical shape. A cover glass 3 is disposed at one end of the outer case 2 along an axis of the cylindrical shape, and a case back 4 is disposed at the other end. The cover glass 3 side of the watch 1 is a front surface side, and the case back 4 side is a back surface side.

A dial 5 serving as a circular and flat metal watch component is disposed on the back surface side of the cover glass 3. A graduation is disposed on the front surface side of the dial 5. In plan view of the dial 5, a hand shaft 6 is disposed at the center of the dial 5. A seconds hand 7, a minute hand 8, and an hour hand 9 are attached to the hand shaft 6. Hereinafter, the seconds hand 7, the minute hand 8, and the hour hand 9 are hands. The hand shaft 6 is formed of three rotary shafts to which the seconds hand 7, the minute hand 8, and the hour hand 9 are attached. The cover glass 3 is transparent, and the dial 5 and the hands are visible through the cover glass 3.

On the back surface side of the dial 5, a movement 11 is housed as a watch movement. The movement 11 includes a main plate 12 serving as a watch component, and a reception component 13 serving as a watch component. A train wheel mechanism 14 is disposed between the main plate 12 and the reception component 13. A step motor 15 is disposed on the main plate 12. A magnetic shield plate 16 serving as a watch component is disposed on the back surface side of the step motor 15. A battery that supplies power to the step motor 15 is disposed between the main plate 12 and the case back 4. The case back 4 is transparent, and the reception component 13 and the magnetic shield plate 16 are visible through the case back 4.

Figure 2:
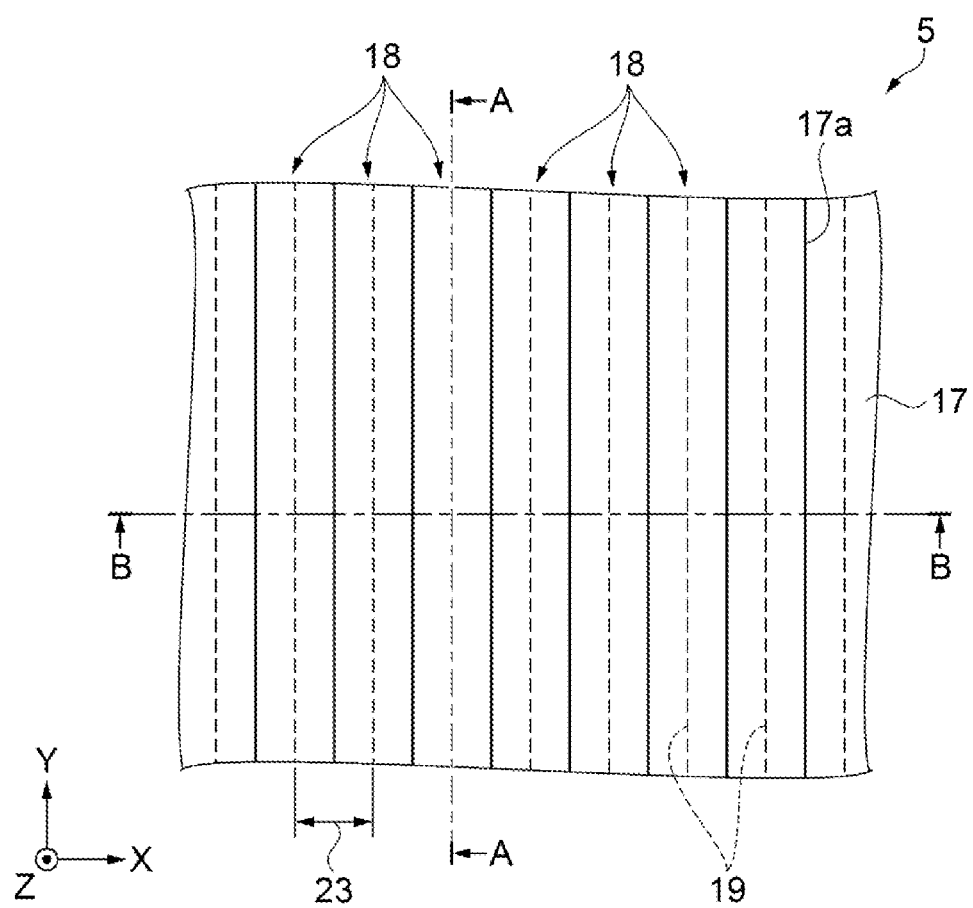
FIG. 2 is a schematic plan diagram of a main portion illustrating a groove shape.
Figure 3:
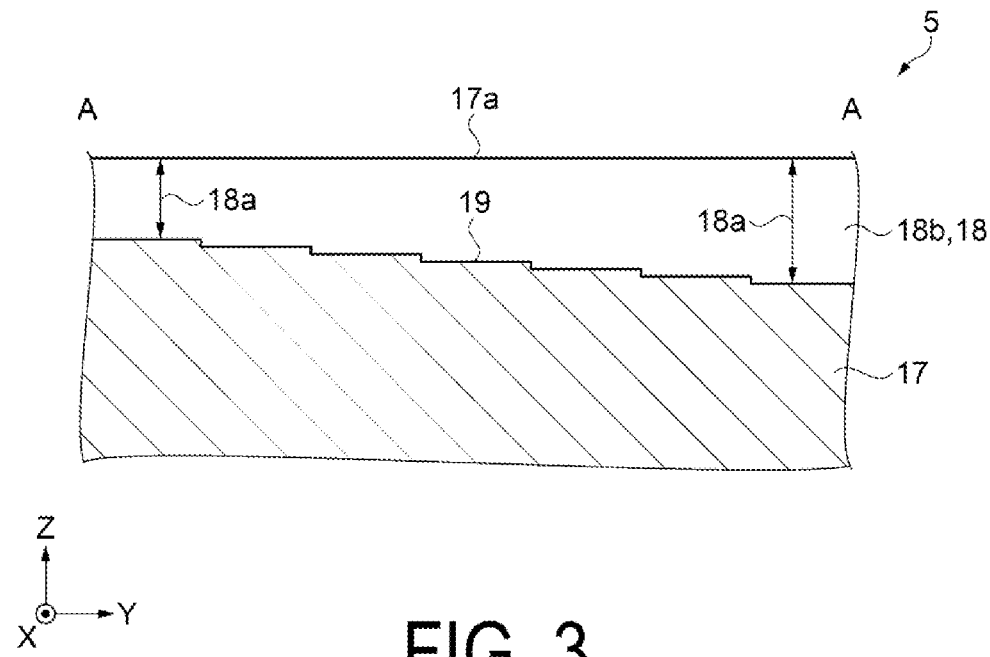
FIG. 3 is a schematic side cross-sectional view of a main portion for illustrating a depth of a groove.
Figure 4:
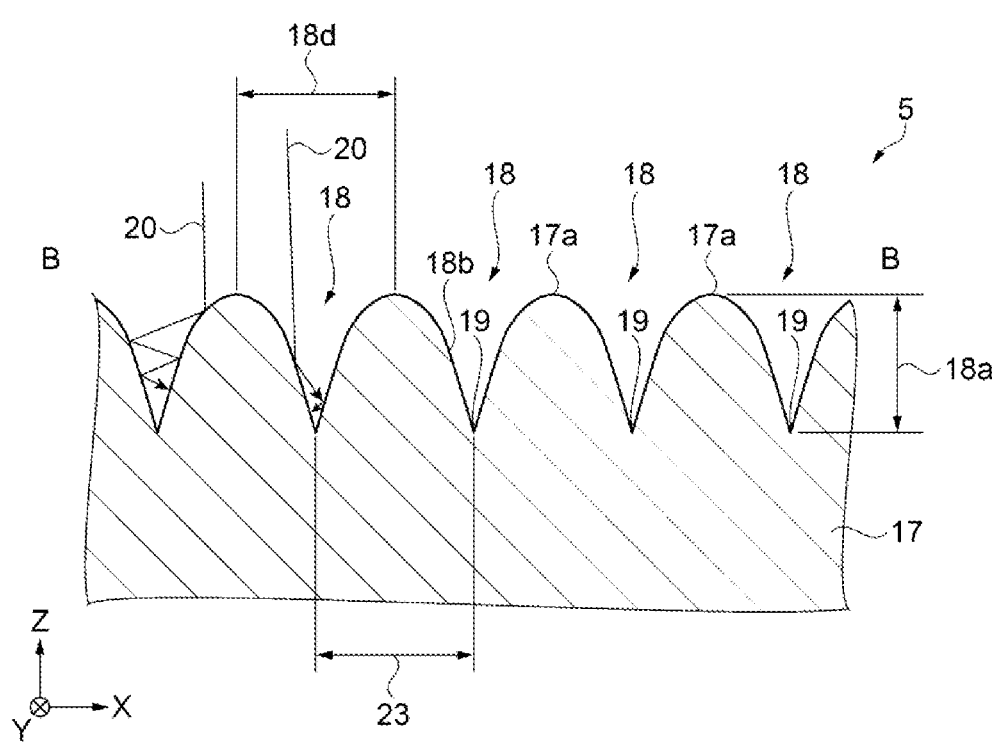
FIG. 4 is a schematic side cross-sectional view of a main portion for illustrating a depth of the groove.

As illustrated in FIGS. 2, 3, and 4, the dial 5 includes a base material 17 serving as a brass watch component. The dial 5 includes first grooves 18 as a plurality of grooves that do not intersect each other in a front surface 17a of the base material 17. A direction in which the first groove 18 extends is a Y direction. A direction orthogonal to the Y direction on the front surface 17a of the base material 17 is an X direction. A direction orthogonal to the front surface 17a of the base material 17 is a Z direction. FIG. 3 is a diagram when a cross section taken along a line A-A in FIG. 2 is viewed from the X positive direction. FIG. 4 is a diagram when a cross section taken along a line B-B in FIG. 2 is viewed from the Y negative direction.

The first groove 18 will be described by using FIG. 4. The plurality of first grooves 18 formed by laser light are provided on the metal base material 17. When viewed from the Y direction being the direction in which the first groove 18 extends, the first groove 18 includes a first bottom 19. A length in the Z direction from the front surface 17a to the first bottom 19 is a first groove depth 18a as a depth of the groove. A method for processing the first groove 18 is illustrated later, and the first groove depth 18a will be described by using FIG. 3. The first groove depth 18a on the Y negative direction side is shallower than the first groove depth 18a on the Y positive direction side. The first groove depth 18a changes stepwise. In this way, the first grooves 18 include portions having different groove depths. The first grooves 18 have an area where the first groove depth 18a is shallow and an area where the first groove depth 18a is deep. As illustrated in FIG. 4, a width of the first groove 18 is a first groove width 18d as a width of the groove. The first groove width 18d is a length between edges where the front surface 17a is recessed. The first groove width 18d is substantially constant.

An interval between the first bottoms 19 adjacent to each other is a pitch 23. The pitch 23 is preferably equal to or greater than 0.025 mm and is equal to or less than 0.075 mm. Furthermore, the pitch 23 is preferably 0.035 mm. When the first groove depth 18a is set deeper, the dial 5 can reduce lightness of light 20 reflected by the first groove 18. In the present embodiment, the pitch 23 is constant.

Figure 5:
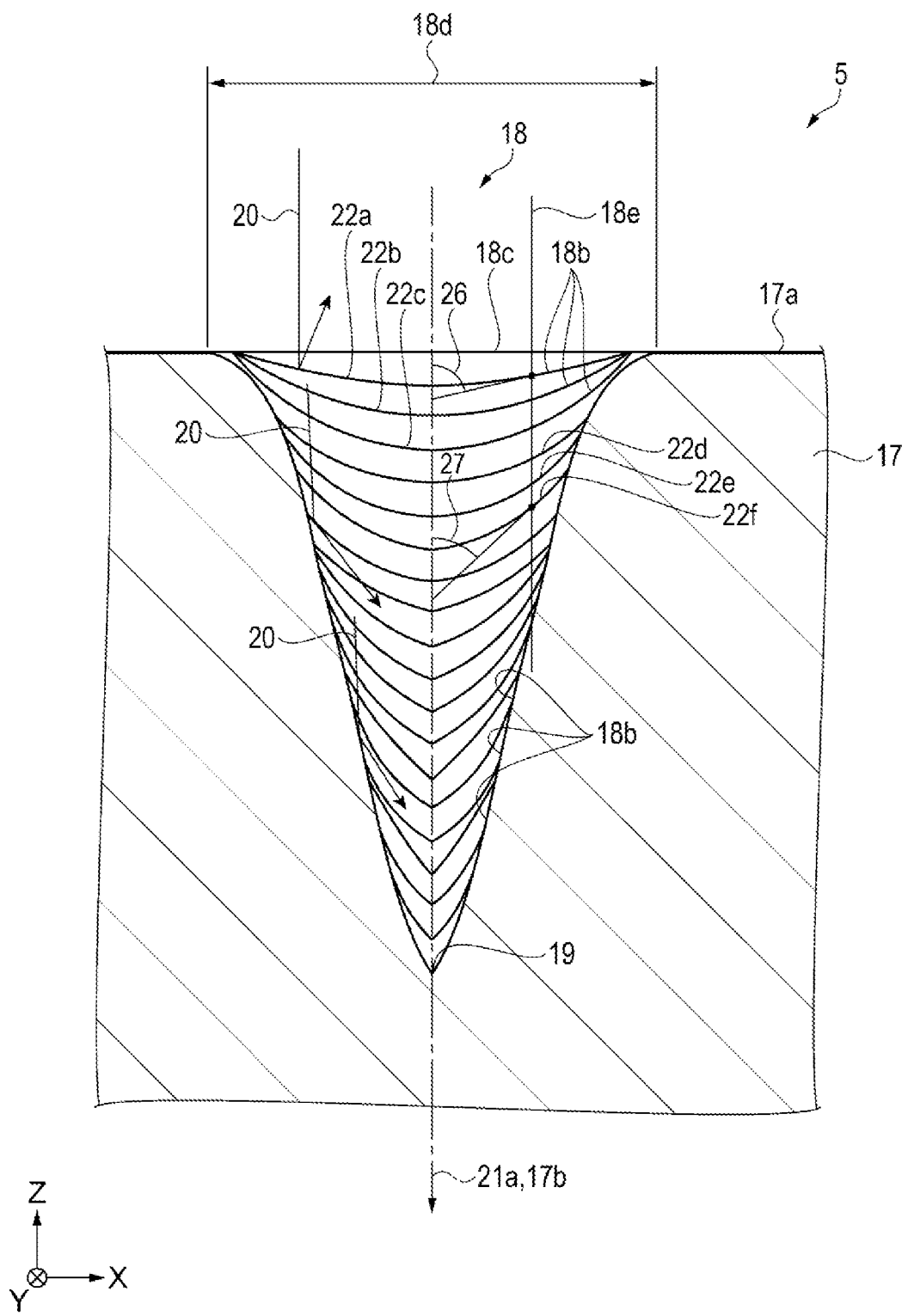
FIG. 5 is a schematic side cross-sectional view of a main portion for illustrating a shape of the groove.

FIG. 5 illustrates a cross-sectional shape of the first groove 18 in multiple stages from a shape when the first groove 18 is shallow to a shape when the first groove 18 is deep. A method for forming the first groove 18 performs manufacturing by varying a depth of the first groove 18 depending on the number of irradiation times that the laser light is applied to the base material. FIG. 5 is a cross section when the first groove 18 is viewed from the Y negative direction. When the number of irradiation times that the laser light is applied is one time, a groove in a first stage can be formed, and when the number of irradiation times is a second time, a groove in a second stage can be formed. In other words, according to the number of irradiation times that the laser light is applied, the first groove 18 includes a groove 22a in a first stage, a groove 22b in a second stage, a groove 22c in a third stage, a groove 22d in a fourth stage, a groove 22e in a fifth stage, and a groove 22f in a sixth stage continuing as grooves.

When the first groove 18 is shallow in such a manner as the groove 22a in the first stage, a first angle 26 formed between a tangent line of a side surface 18b and a normal line direction 17b of the front surface 17a is great. For example, when a position of the side surface 18b is assumed to be a first comparison place 18e moved by 174 of a width of the first groove 18 in the X direction from the first bottom 19, a tangent line of the side surface 18b in the first comparison place 18e is used for comparison. At this time, the light 20 applied to the side surface 18b easily advances toward an opening 18c of the first groove 18. As the first groove 18 becomes deeper, the angle formed between the tangent line of the side surface 18b and the normal line direction 17b of the front surface 17a becomes smaller.

For example, when the first groove 18 is deep in such a manner as the groove 22f in the sixth stage, a sixth angle 27 formed between the tangent line of the side surface 18b and the normal line direction 17b of the front surface 17a is smaller than the first angle 26. At this time, the light 20 applied to the side surface 18b easily advances toward the first bottom 19. Thus, when the first groove 18 is shallow, the first groove 18 appears bright, and the first groove 18 appears darker as the first groove 18 becomes deeper.

According to the configuration of the dial 5, the light 20 applied to the first groove 18 is reflected by the side surface 18b of the first groove 18 and advances to the first bottom 19. When a depth of the first groove 18 is deep as compared to a case in which the depth is shallow, the number of times that the light 20 reaching the first bottom 19 is reflected by the side surface 18b of the first groove 18 when returning to the opening 18c is greater. As the light 20 reflected by the side surface 18b of the first groove 18 has a greater number of reflection times, the light 20 is absorbed by the side surface 18b, and thus the light 20 is less likely to return to the opening 18c. Thus, when a depth of the first groove 18 is deep as compared to a case in which the depth is shallow, the reflected light 20 becomes weaker, which makes it darker. Since the first grooves 18 include portions varying in the first groove depth 18a, the first grooves 18 can include a portion where the intensity of the reflected light 20 is strong and a portion where the intensity is weak. Since the first groove depth 18a gradually changes from a shallow area to a deep area, the dial 5 can perform rich representation having gradual shades of color. Note that, in addition to the first groove depth 18a being gradually changed from a shallow area to a deep area, representation having a variety of lightness can be performed by, for example, alternately providing regions having a deep groove depth and a shallow groove depth and by varying a ratio of regions having a deep groove depth and a shallow groove depth per unit area.

$0<B\leq 6\times A$, wherein the first groove width 18d is A and the first groove depth 18a is B. For example, when A=25 μm, 0 μm<B≤150 μm. The first groove width 18d is preferably equal to or greater than 20 μm and equal to or less than 30 μm. When the first groove width 18d is less than 20 μm, the number of the first grooves 18 per unit length is increased. Since the number of times that the laser light 21 is applied when the first groove 18 is formed is increased, productivity is poor. When the first groove width 18d exceeds 30 μm, a width of the laser machining groove increases and an interval for providing a lightness difference increases, and thus fine design representation becomes difficult.

According to the structure of the dial 5, 0 μm<B, and thus the first groove 18 has a shape being recessed from the front surface 17a. When B>6×A, darkness of the first groove 18 is not different from that when B=6×A. Therefore, by setting B≤6×A, effort to form the first groove 18 can be reduced.

The angle formed between the side surface 18b of the first groove 18 and the normal line direction 17b of the front surface 17a of the base material 17 is smaller in the area where the first groove depth 18a is deep than in the area where the first groove depth 18a is shallow.

According to the structure of the dial 5, the first groove 18 at a place where an angle formed between the side surface 18b of the first groove 18 and an optical axis 21a of the laser light 21 is greater has greater intensity of the light 20 reflected toward the Z positive direction than the first groove 18 at a place where the angle is smaller. Therefore, a place where the first groove depth 18a is shallower can be made brighter, and a place where the first groove depth 18a is deeper can be made darker.

Figure 6:
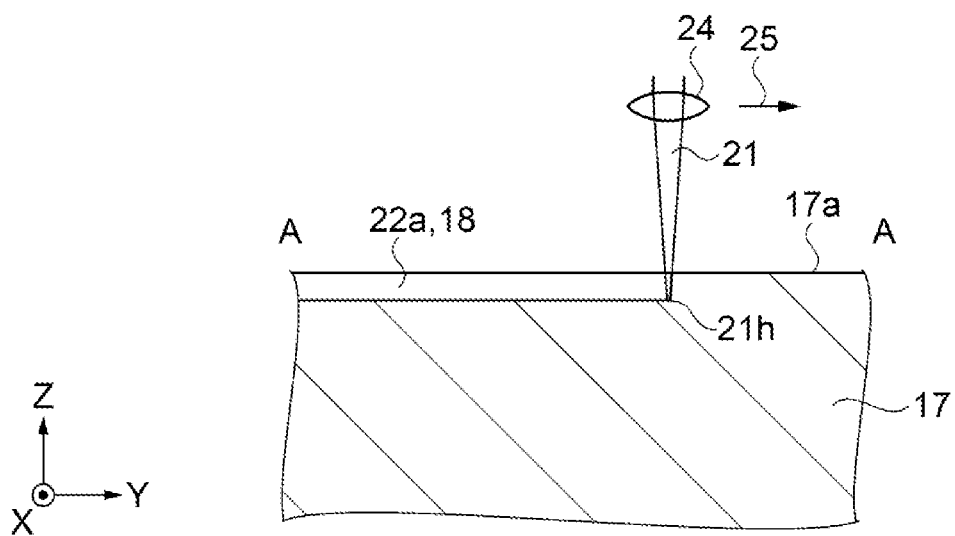
FIG. 6 is a schematic side cross-sectional view for illustrating a method for forming a groove.

A method for manufacturing the first groove 18 will be described by using FIGS. 6 to 10. FIG. 6 illustrates a state where the first groove 18 is formed by laser light with respect to the base material 17 (watch component). As illustrated in FIG. 6, condensed laser light 21 is applied to the front surface 17a of the base material 17. The first groove 18 is formed by irradiation of the laser light 21 having a pulse of a duration of less than 1 picosecond. A step of forming the first groove 18 by advancing, in a predetermined scanning direction 25, a place where the laser light 21 is applied to the base material 17 is performed. First, the groove 22a in the first stage is formed. In the present exemplary embodiment, for example, femtosecond laser of YAG laser is used. A place where the laser light 21 is condensed by a lens 24 is a condensation portion 21h. The condensation portion 21h is moved in the Y direction. The groove 22a in the first stage is formed at the place where the laser light 21 is applied. FIG. 6 illustrates a state where the groove is formed by scanning for a first time.

Figure 7:
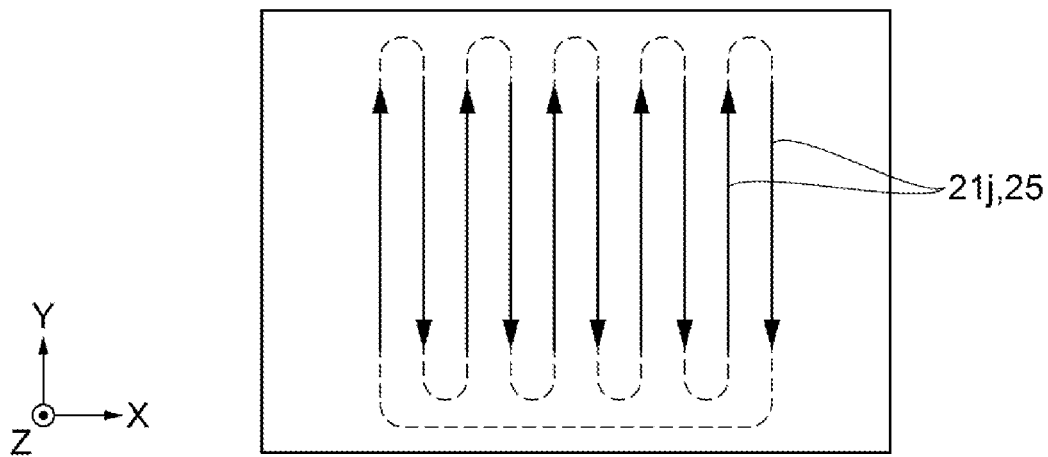
FIG. 7 is a schematic plan diagram for illustrating the method for forming a groove.

FIG. 7 illustrates a track 21j in which the condensation portion 21h of the laser light 21 is moved. A solid line of the track 21j is a portion irradiated with the laser light 21. A dashed line of the track 21j is a portion without irradiation of the laser light 21. In the track 21j, a portion advancing in the Y positive direction and a portion advancing in the Y negative direction are alternately disposed. A direction in which a place of the track 21j irradiated with the laser light 21 moves corresponds to the scanning direction 25. The track 21j including the solid line and the dashed line is one stroke. By setting the track 21j as one stroke, the first groove 18 can be drawn efficiently.

Note that the YAG laser is infrared light, but the laser light 21 having a wavelength of green or purple shorter than that of infrared light may be used. A cross-sectional shape of the first groove 18 that is finer can be made into a fine needle shape. A diameter of the condensation portion 21h on which the laser light 21 is condensed is preferably equal to or greater than 5 μm and equal to or less than 60 μm. Furthermore, a diameter of the condensation portion 21h is preferably equal to or greater than 20 μm and equal to or less than 30 μm. Furthermore, a diameter of the condensation portion 21h is preferably 25 μm. The first groove 18 having a cross-sectional shape that the light 20 is less likely to be reflected can be formed. A diameter of the condensation portion 21h indicates a length in a plane orthogonal to the traveling direction of the laser light 21. When a cross section of the condensation portion 21h is an ellipse, an average diameter acquired by averaging a long axis and a short axis is assumed to be a diameter of the condensation portion 21h.

Figure 8:
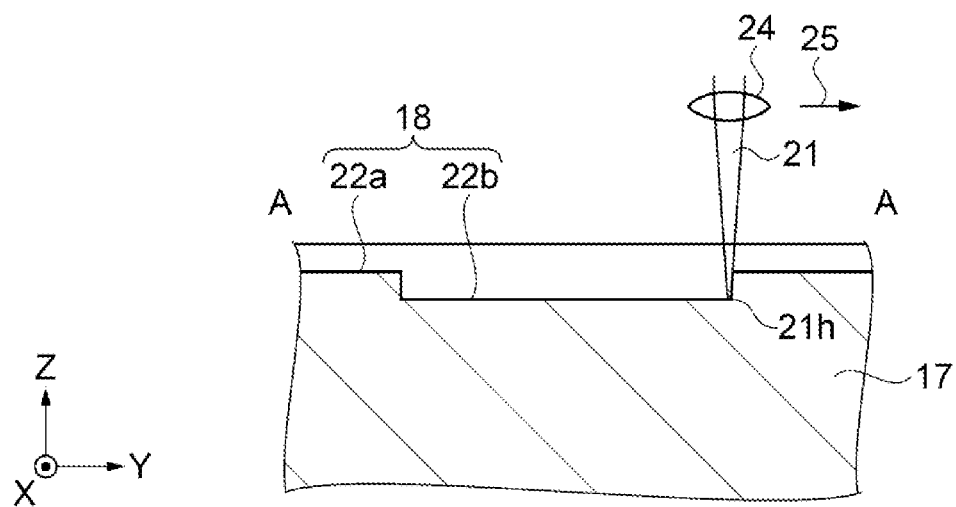
FIG. 8 is a schematic side cross-sectional view for illustrating the method for forming a groove.

As illustrated in FIG. 8, the condensed laser light 21 is applied to the groove 22a in the first stage from the middle of the groove 22a in the first stage. The condensation portion 21h is moved in the Z negative direction by a depth of the groove 22a in the first stage from the front surface 17a. The condensed laser light 21 moves in the Y direction along the groove 22a in the first stage. The groove 22b in the second stage is formed at the place irradiated with the laser light 21. The groove 22b in the second stage is formed by advancing, in the predetermined scanning direction 25, the place where the laser light 21 is applied to the base material 17. The groove 22b in the second stage is deeper than the groove 22a in the first stage.

Figure 9:
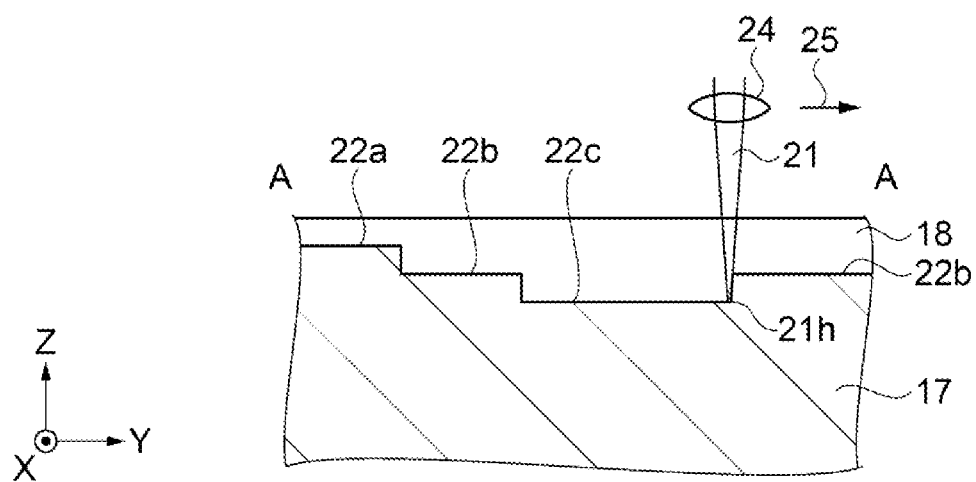
FIG. 9 is a schematic side cross-sectional view for illustrating the method for forming a groove.

As illustrated in FIG. 9, the condensed laser light 21 is applied to the groove 22b in the second stage from the middle of the groove 22b in the second stage. The condensation portion 21h is moved in the Z negative direction by a depth of the groove 22b in the second stage from the front surface 17a. The condensed laser light 21 moves in the Y direction along the groove 22b in the second stage. The groove 22c in the third stage is formed at the place irradiated with the laser light 21. The groove 22c in the third stage is formed by advancing, in the predetermined scanning direction 25, the place where the laser light 21 is applied to the base material 17. The groove 22c in the third stage is deeper than the groove 22b in the second stage.

Figure 10:
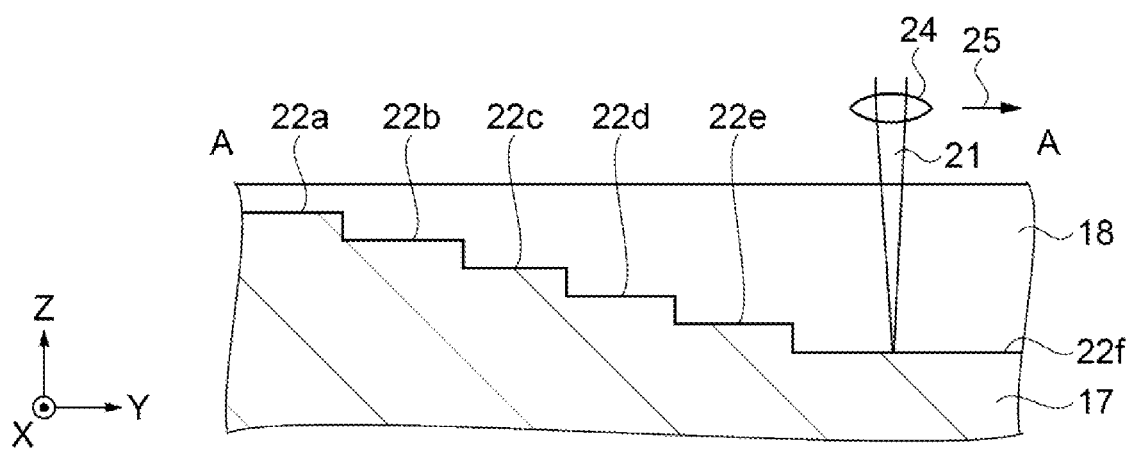
FIG. 10 is a schematic side cross-sectional view for illustrating the method for forming a groove.

As illustrated in FIG. 10, the groove 22d in the fourth stage, the groove 22e in the fifth stage, and the groove 22f in the sixth stage are formed by using the method for forming the groove 22b in the second stage and the groove 22c in the third stage. Furthermore, the first groove 18 having multiple stages is continuously formed. As a result, the first groove 18 in which the first groove depth 18a changes in multiple stages is manufactured. In this way, a depth of the first groove 18 is controlled by the number of irradiation times that the laser light 21 is applied. The number of irradiation times in an area where the first groove depth 18a is deep is greater than the number of irradiation times in an area where the first groove depth 18a is shallow.

According to a method for decorating the dial 5, the first groove 18 is formed by irradiation of the laser light 21 having a pulse of a duration of less than 1 picosecond. There are a place having a greater number of times that the laser light 21 is applied and a place having a smaller number of times that the laser light 21 is applied. The first groove 18 is formed deeper at the place having a greater number of times that the laser light 21 is applied than at the place having a smaller number of times that the laser light 21 is applied. Therefore, the first grooves 18 have a deep place and a shallow place, and thus the method for decorating the dial 5 can form a portion where the intensity of the reflected light 20 is strong and a portion where the intensity is weak.

In the method of JP-T-2015-514582, the first groove 18 in a 10-th stage is formed while the pitch 23 is 0.01 mm and a movement speed of the laser light 21 to be applied is 100 mm/sec. At this time, the time for processing 1 mm2 is 10 seconds. Lightness L* of the light 20 reflected by the base material 17 is 19.4. Note that the lightness is a value obtained by reproduction processing for comparison with the present exemplary embodiment. In the method according to the present exemplary embodiment, at the time when the first groove 18 having 25 stages is formed while the pitch 23 is 0.035 mm and a movement speed of the laser light 21 to be applied is 1000 mm/sec, the time for processing 1 mm2 is 1.43 seconds. When processing is reproduced under the processing condition of JP-T-2015-514582, the lightness L* of the light 20 reflected by the base material 17 is 12.7. In this way, a low reflection surface is formed in a short time. A value of the lightness L* described above is a measurement result of a colorimetric value (incident angle 45°). The same holds true for the lightness L* used hereinafter.

As illustrated in FIG. 5, processing is performed so that the angle formed between the side surface 18b of the first groove 18 and the optical axis 21a of the laser light 21 is smaller at a place where the first groove depth 18a is deep than at a place where the first groove depth 18a is shallow. For example, the angle formed between the side surface 18b of the groove 22a in the first stage and the optical axis 21a of the laser light 21 is the first angle 26. The angle formed between the side surface 18b of the groove 22f in the sixth stage and the optical axis 21a of the laser light 21 is the sixth angle 27. The processing is performed so that the sixth angle 27 is smaller than the first angle 26.

According to the method for decorating the dial 5, the first groove 18 at a place where the angle formed between the side surface 18b of the first groove 18 and the optical axis 21a of the laser light 21 is greater has greater intensity of the light 20 reflected toward the Z positive direction than the first groove 18 at a place where the angle is smaller. Therefore, a place where the first groove depth 18a is shallower can be made brighter, and a place where the first groove depth 18a is deeper can be made darker.

Second Exemplary Embodiment

Figure 11:
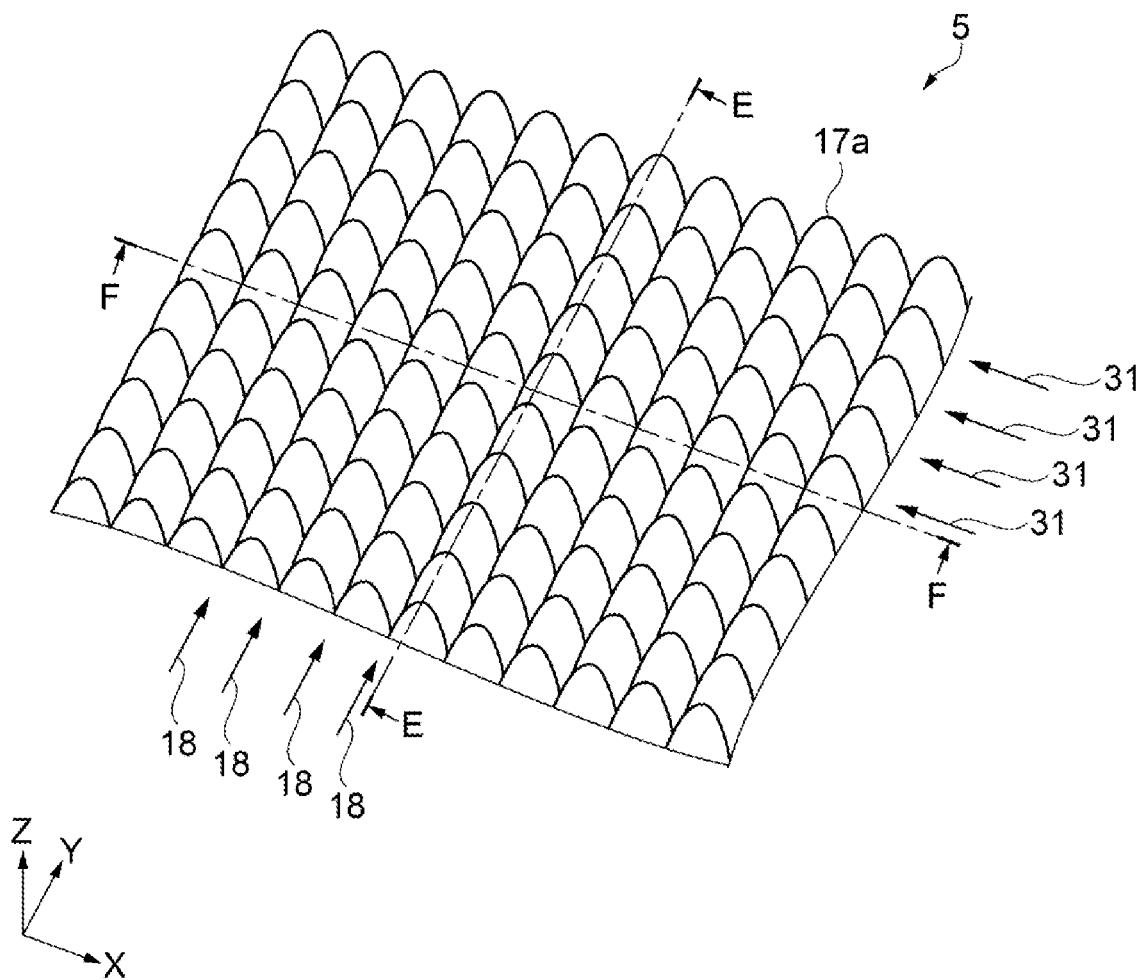
FIG. 11 is a schematic perspective view illustrating a groove shape according to a second exemplary embodiment.
Figure 12:
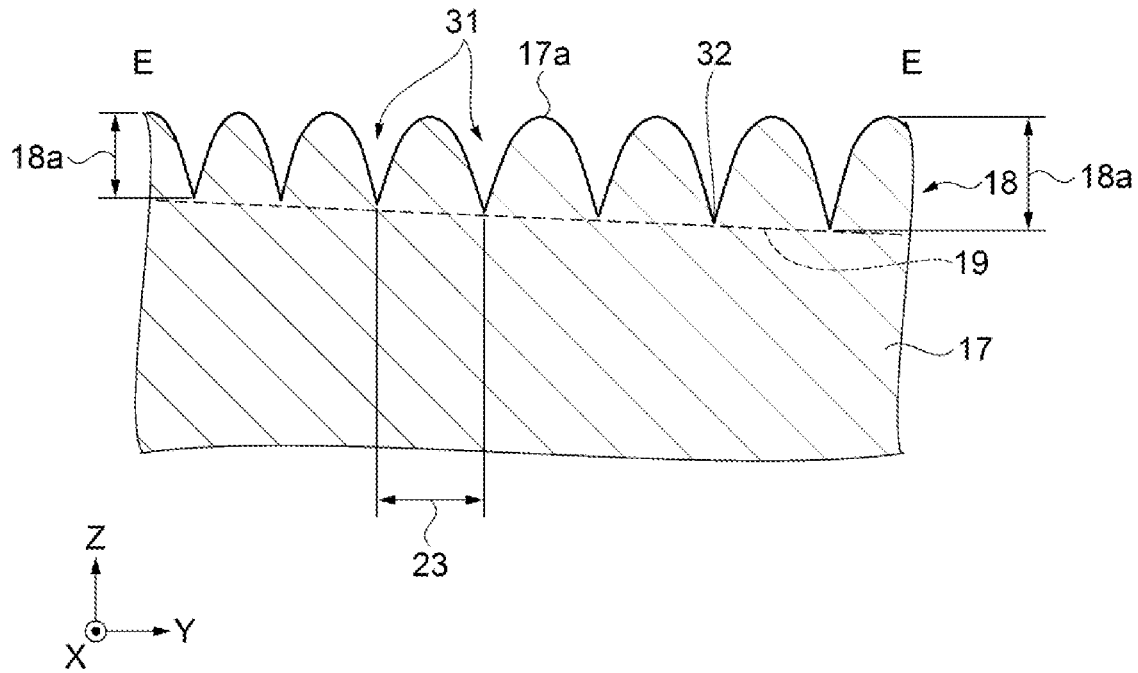
FIG. 12 is a schematic side cross-sectional view illustrating a groove shape.
Figure 13:
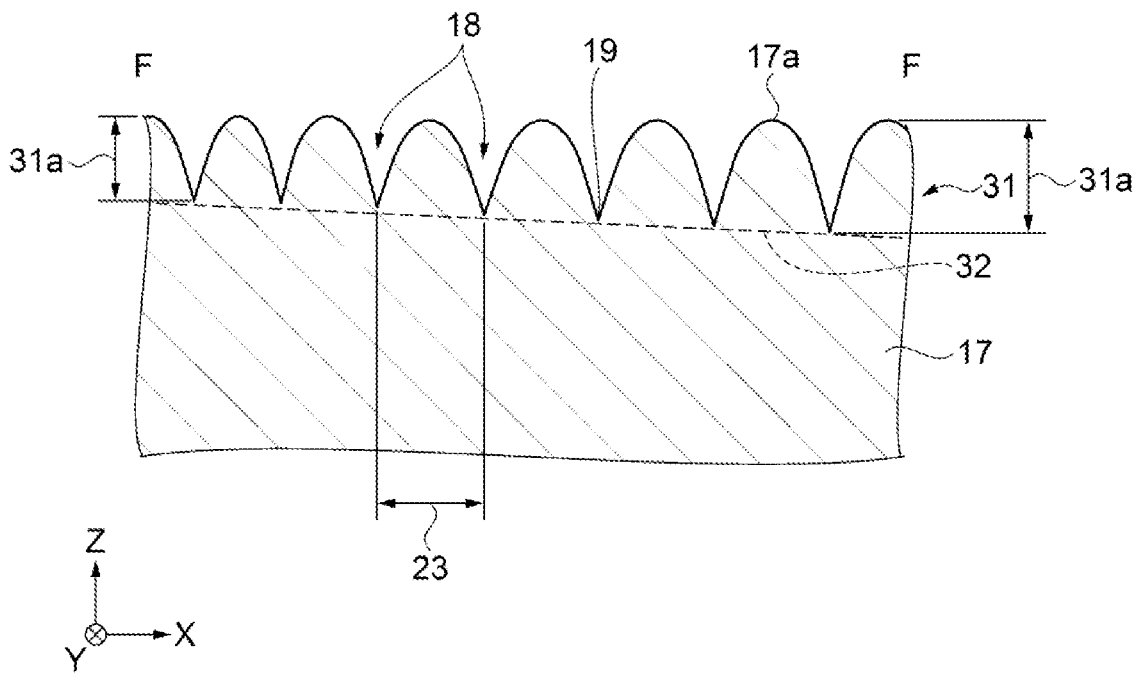
FIG. 13 is a schematic side cross-sectional view illustrating a groove shape.

As illustrated in FIG. 11, a dial 5 includes a groove in the X direction and a groove in the Y direction. FIG. 12 is a diagram when a cross section taken along a line E-E in FIG. 11 is viewed from the X positive direction. FIG. 13 is a diagram when a cross section taken along a line F-F in FIG. 11 is viewed from the Y negative direction. As illustrated in FIGS. 11, 12, and 13, the dial 5 includes a plurality of first grooves 18 that do not intersect each other in a front surface 17a of a base material 17. The first groove 18 is in the form described in the first exemplary embodiment. Furthermore, the dial 5 includes a plurality of second grooves 31 that do not intersect each other in the front surface 17a of the base material 17. The first groove 18 and the second groove 31 intersect each other. Specifically, the first groove 18 and the second groove 31 are orthogonal to each other.

The second groove 31 will be described by using FIG. 12. When viewed from the X direction being a direction in which the second groove 31 extends, the second groove 31 includes a second bottom 32. As illustrated in FIG. 13, a length in the Z direction from the front surface 17a to the second bottom 32 is a second groove depth 31a. The second groove depth 31a on the X negative direction side is shallower than the second groove depth 31a on the X positive direction side. The second groove depth 31a changes stepwise. In this way, the second grooves 31 include portions having different groove depths. Note that a groove width and a pitch 23 of the second grooves 31 are constant.

According to this configuration, since the first groove 18 and the second groove 31 include portions varying in depth of the groove, the first groove 18 and the second groove 31 can include a portion where the intensity of reflected light 20 is strong and a portion where the intensity is weak. An appearance of shades of color changes depending on a viewing direction when the second groove 31 is not provided and only the first groove 18 is provided. Since the first groove 18 and the second groove 31 intersect each other, the dial 5 can reduce a change in shades of color due to the viewing direction.

According to this configuration, the first groove 18 and the second groove 31 are orthogonal to each other. By disposing the dial 5 on the XY table and forming the first groove 18 and the second groove 31, the first groove 18 and the second groove 31 can be easily formed.

Third Exemplary Embodiment

Figure 14:
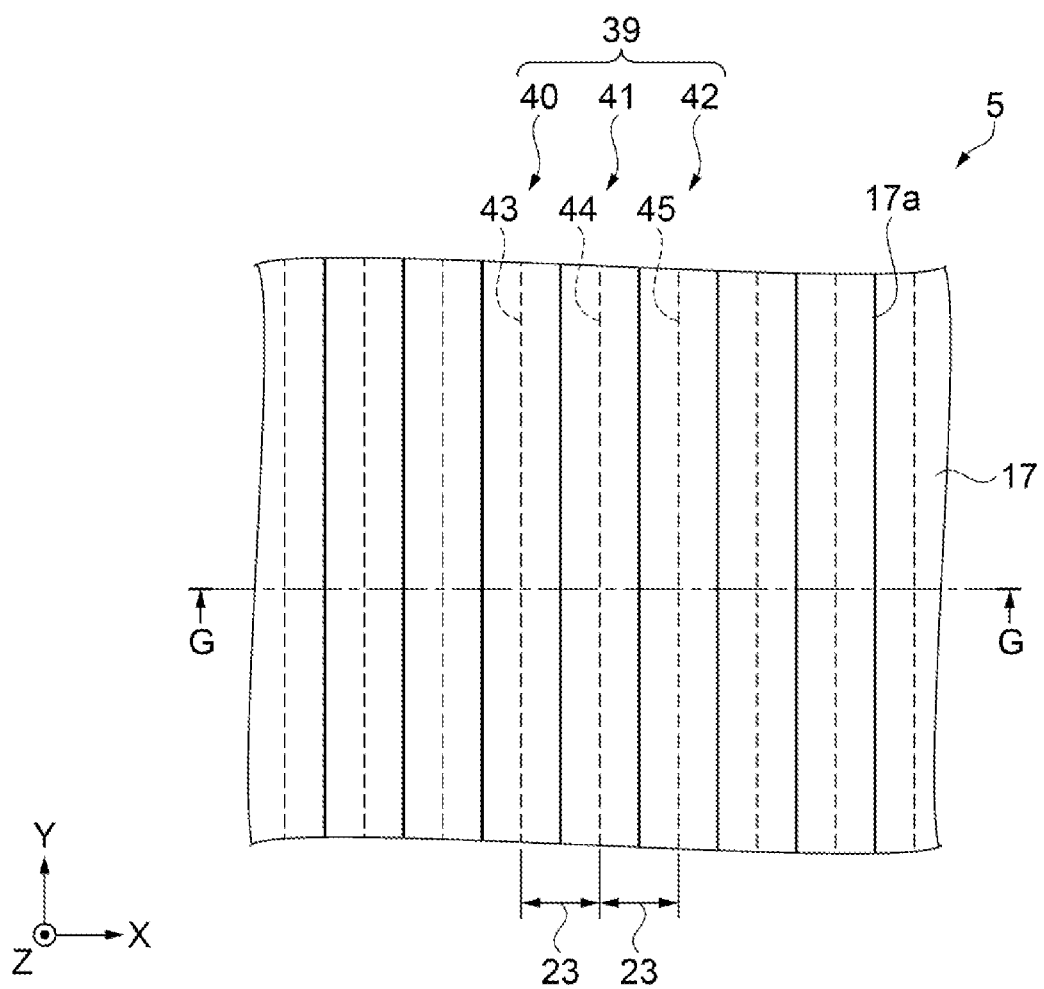
FIG. 14 is a schematic plan view of a main portion illustrating a groove shape according to a third exemplary embodiment.
Figure 15:
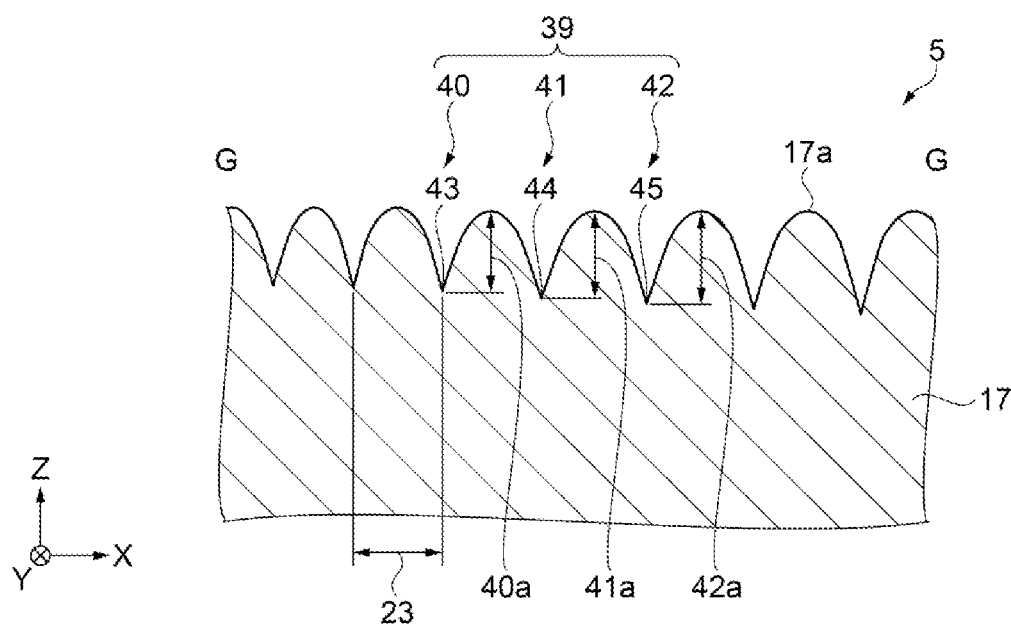
FIG. 15 is a schematic side cross-sectional view illustrating a groove shape.

FIG. 14 is a diagram when a dial 5 is viewed from the Z direction. FIG. 15 is a diagram when a cross section taken along a line G-G in FIG. 14 is viewed from the Y negative direction. As illustrated in FIGS. 14 and 15, the dial 5 includes a plurality of grooves 39 that do not intersect each other in a front surface 17a of a base material 17. Each of a third groove 40, a fourth groove 41, and a fifth groove 42 is one of the grooves 39. Therefore, the dial 5 includes the third groove 40, the fourth groove 41, and the fifth groove 42 that do not intersect each other in the front surface 17a of the base material 17. A width and a pitch 23 of the grooves 39 are constant.

The third groove 40 will be described by using FIG. 15. When viewed from a direction in which the third groove 40 extends, the third groove 40 includes a third bottom 43. When viewed from a direction in which the fourth groove 41 extends, the fourth groove 41 includes a fourth bottom 44. When viewed from a direction in which the fifth groove 42 extends, the fifth groove 42 includes a fifth bottom 45.

A depth of the third groove 40 is a third groove depth 40a. A depth of the fourth groove 41 is a fourth groove depth 41a. A depth of the fifth groove 42 is a fifth groove depth 42a. The fourth groove depth 41a is deeper than the third groove depth 40a. The fifth groove depth 42a is deeper than the fourth groove depth 41a. Therefore, the depth of the third groove 40 and the depth of the fourth groove 41 are different.

According to this configuration, the third groove depth 40a and the fourth groove depth 41a are different. Therefore, light 20 reflected by the third groove 40 and the fourth groove 41 can have different intensities. As a result, rich representation having gradual shades of color can be performed by changing a depth of the groove.

Fourth Exemplary Embodiment

Figure 16:
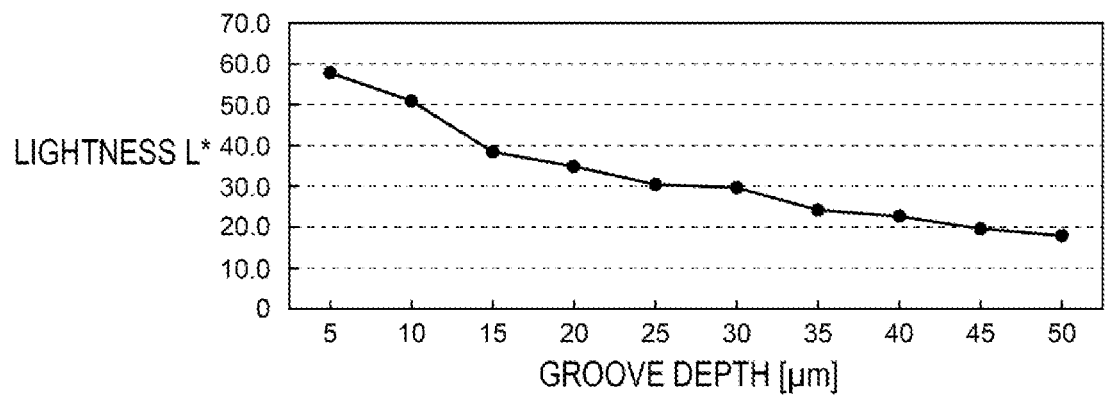
FIG. 16 is a diagram for illustrating a relationship between a depth of a groove and lightness according to a fourth exemplary embodiment.

FIG. 16 illustrates an example of a relationship between a first groove depth 18a of a base material 17 in which a first groove 18 is formed and lightness L* of light 20 to be reflected. Lightness L* in a vertical axis indicates the lightness L* of the light 20 reflected by the base material 17. A depth of a groove in a horizontal axis indicates the first groove depth 18a. A material of the base material 17 is brass. A pitch 23 is 0.035 mm. A movement speed of laser light 21 applied to the base material 17 is 1000 mm/s. It can be confirmed that a deeper depth of the groove reduces the lightness L* of the light 20 reflected by the base material 17. When the first groove depth 18a is 50 μm, the lightness L* of the light 20 to be reflected can be set less than 20. Since a correlation between the first groove depth 18a and the lightness L* is high, rich representation having gradual shades of color can be performed by adjusting the first groove depth 18a.

Fifth Exemplary Embodiment

Figure 17:
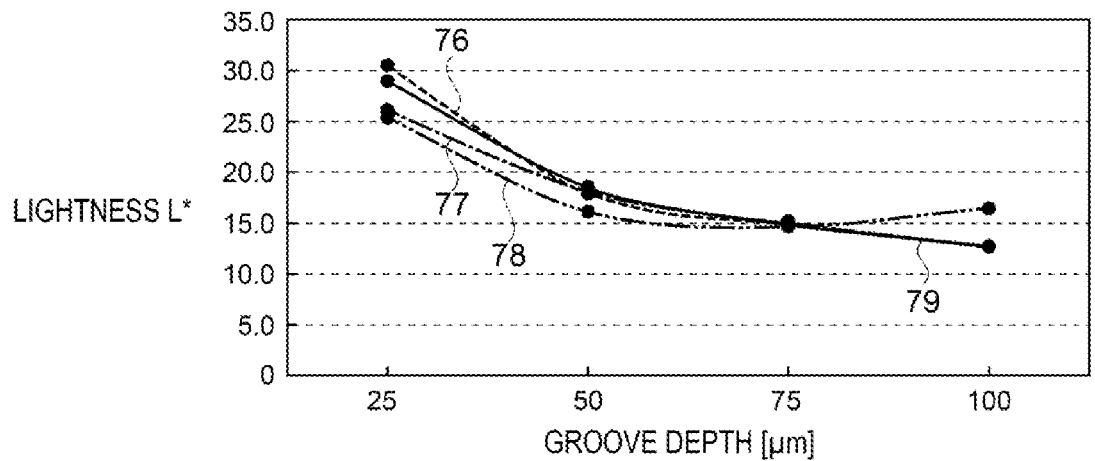
FIG. 17 is a diagram for illustrating a relationship between a depth of a groove and lightness in each material according to a fifth exemplary embodiment.

FIG. 17 illustrates an example of a relationship between a first groove 18 that is formed in a lattice pattern in a base material 17 of brass, pure iron, stainless steel, and nickel silver and has a first groove depth 18a, and lightness L* of light 20 to be reflected. A first data line 76 indicates a case of brass. A second data line 77 indicates a case of pure iron.

A third data line 78 indicates a case of stainless steel. A fourth data line 79 indicates nickel silver.

As indicated by the first data line 76 to the fourth data line 79, the lightness L* changes stepwise in a range of a depth of the groove of 25 μm to 50 μm. In this way, a material of the base material 17 can be applied to any of brass, pure iron, stainless steel, and nickel silver. The base material 17 of brass, pure iron, stainless steel, and nickel silver can have a place where the intensity of the light 20 reflected by the first groove 18 is different.

Sixth Exemplary Embodiment

Figure 18:
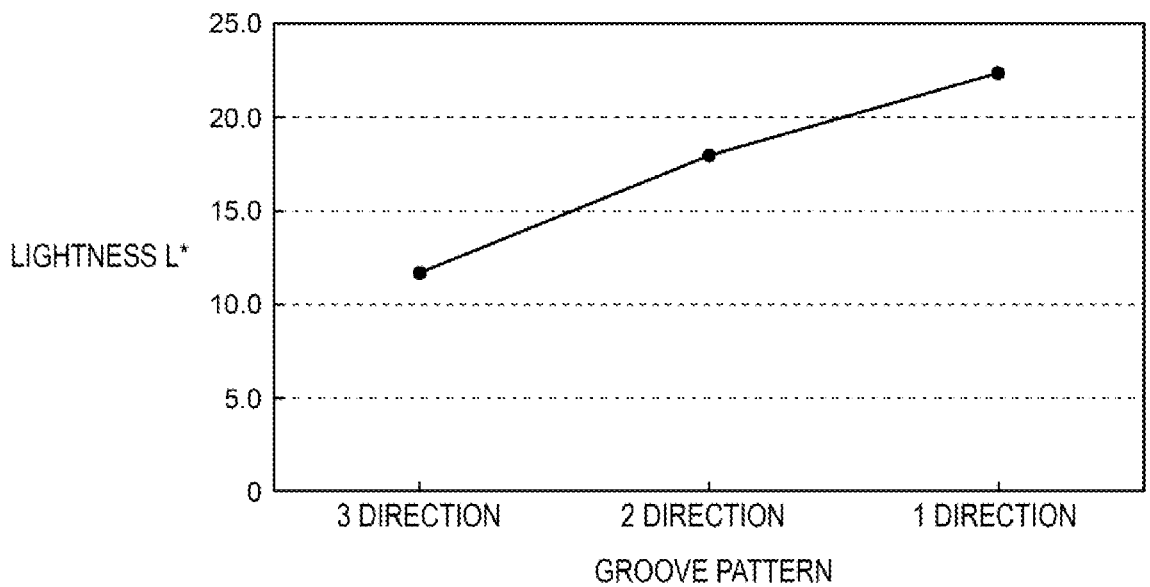
FIG. 18 is a diagram illustrating a relationship between a pattern of a groove and lightness according to a sixth exemplary embodiment.

FIG. 18 illustrates an example of a relationship between a pattern of a first groove 18 formed in a base material 17 and lightness L* of light 20 to be reflected. A "3 direction", a "2 direction", and a "1 direction" are disposed on a horizontal axis. A first groove depth 18a is processed to target 50 μm.

Figure 19:
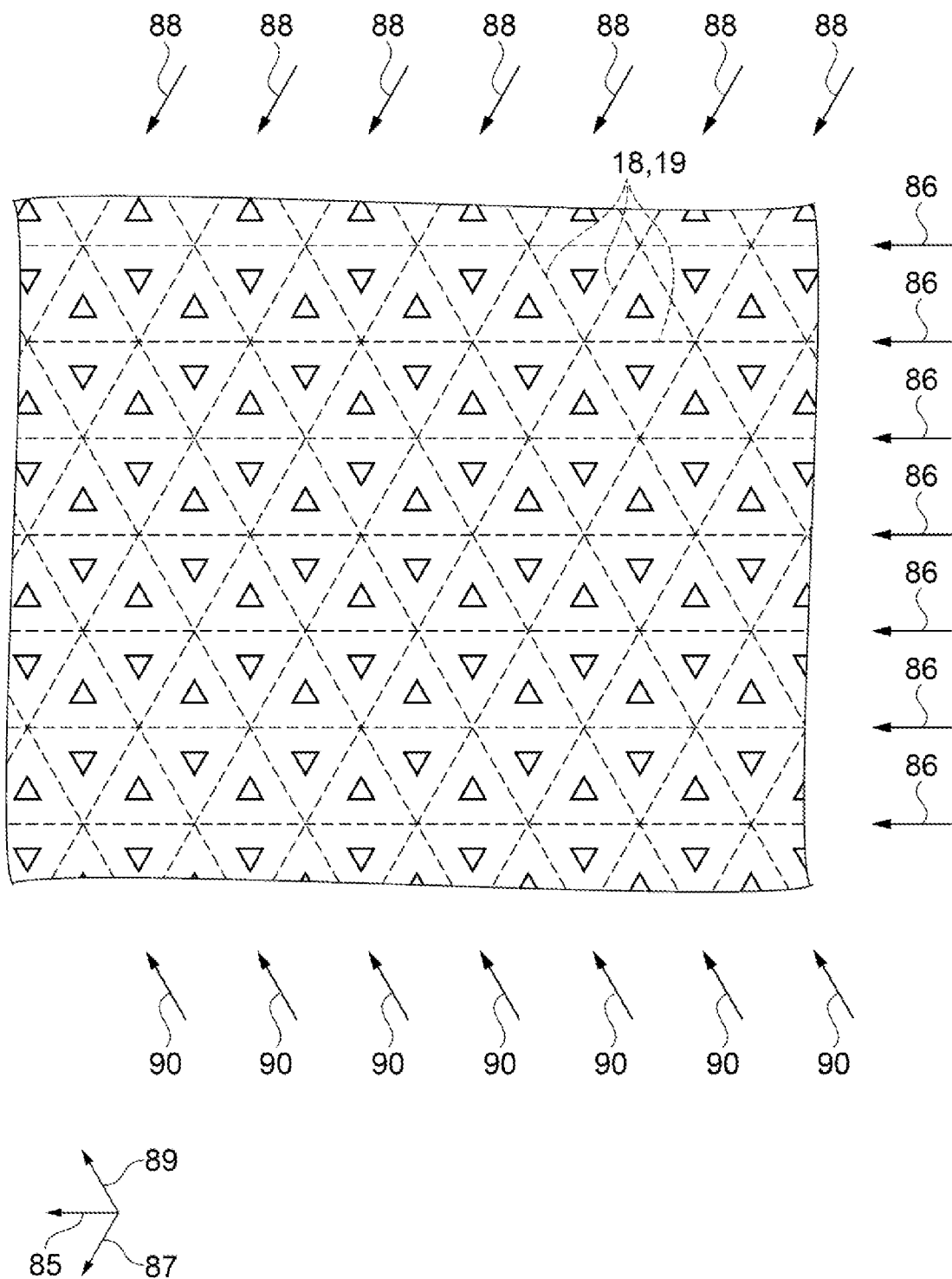
FIG. 19 is a schematic plan view for illustrating a pattern of a groove.

The "3 direction" indicates a case of a layout of the first groove 18 illustrated in FIG. 19. The base material 17 includes a plurality of first grooves 86 extending in a first direction 85, a plurality of second grooves 88 extending in a second direction 87, and a plurality of third grooves 90 extending in a third direction 89. An angle formed between the first direction 85 and the second direction 87 is 60 degrees. An angle formed between the first direction 85 and the third direction 89 is 60 degrees. The "2 direction" indicates a case of a layout of the grooves 18 and 31 illustrated in FIG. 11. The base material 17 includes the plurality of first grooves 18 extending in the Y direction and the plurality of second grooves 31 extending in the X direction. The "1 direction" indicates a case of a layout of the first groove 18 illustrated in FIG. 2. The base material 17 includes the plurality of first grooves 18 extending in parallel with the Y direction.

As illustrated in FIG. 18, the "1 direction" is the brightest and the "3 direction" is the darkest. In the "1 direction", a direction in which laser light 21 scans is one direction, and thus setting of a device is easy. In the "3 direction", a scanning direction of the laser light 21 is three directions, and setting takes time.

Seventh Exemplary Embodiment

FIG. 20 illustrates a processing condition for each material of a base material 17. "Power in target" indicates optical intensity of a place where laser light 21 is condensed. "Average diameter of beam at target" indicates an average diameter of a condensation portion 21h of the laser light 21. "Repetition frequency" indicates a period in which the laser light 21 is emitted. "Scanning strategy" indicates a pattern of a first groove 18 formed in the base material 17. "Cross hatching" indicates a layout of the first groove 18 and the second groove 31 illustrated in FIG. 11. "Scanning pitch" indicates a pitch 23 of the first groove 18. "Scanning speed" indicates a speed at which the condensation portion 21h of the laser light 21 moves. "Pulse interval" is acquired by dividing the scanning speed by the repetition frequency. When the condensation portion 21h moves while the laser light 21 is intermittently applied, "pulse interval" indicates an interval between places to be irradiated. "Target depth at which lightness is equal to or less than 20" is 50 μm for all materials. In other words, for all materials, when the first groove 18 having the first groove depth 18a of 50 μm is formed, the lightness L* is equal to or less than 20.

When a material of the base material 17 is brass, pure iron, stainless steel, and nickel silver, the lightness L* of the light 20 to be reflected can be set equal to or less than 20.

Eighth Exemplary Embodiment

In the first exemplary embodiment, the first groove 18 is formed by using the laser light 21. A metal film may be provided on the front surface 17a of the base material 17. The metal film can be easily formed by plating. The metal film may also be formed on the first groove 18. According to this configuration, a color tone of the front surface 17a of the base material 17 can be changed. This content can also be applied to the second exemplary embodiment to the eighth exemplary embodiment.

Ninth Exemplary Embodiment

The first groove 18, the second groove 31, and the groove 39 describe above are disposed in the dial 5. The first groove 18, the second groove 31, and the groove 39 described above may be disposed in a watch component of the movement 11. In other words, a watch component of the movement 11 may include the first groove 18, the second groove 31, and the groove 39. According to this configuration, the watch movement 11 can include a watch component having a place where the intensity of the light 20 reflected in a region including the first groove 18, the second groove 31, and the groove 39 is different. In this way, a variety of lightness representations can be achieved, and design of the watch component can be enhanced.

Tenth Exemplary Embodiment

The first groove 18, the second groove 31, and the groove 39 described above may be disposed in a watch component other than the dial 5. According to this configuration, the watch 1 can include a watch component having a place where the intensity of the light 20 reflected in a region including the first groove 18, the second groove 31, and the groove 39 is different. In this way, a variety of lightness representations can be achieved, and design of the watch component can be enhanced.

Eleventh Exemplary Embodiment

The first groove 18, the second groove 31, and the groove 39 described above may be disposed in any of the dial 5, a train wheel bridge, the magnetic shield plate 16, the main plate 12, the reception component 13, a crown, and the like that are watch components. According to this configuration, the dial 5, the train wheel bridge, the magnetic shield plate 16, the main plate 12, the reception component 13, the crown, and the like can have a place where the intensity of the light 20 reflected in a region including the first groove 18, the second groove 31, and the groove 39 is different. In this way, a variety of lightness representations can be achieved, and design of the watch component can be enhanced.

What is claimed is:
1. A timepiece component comprising:
   a metal base material having a surface;
   a plurality of first grooves formed in the surface and extending in a first direction, the plurality of first grooves not intersecting each other, the plurality of first grooves having a shallower depth groove and a deeper depth groove, a depth of the shallower depth groove being shallower than a depth of the deeper depth groove; and a plurality of second grooves formed in the surface and extending in a second direction, the plurality of second grooves not intersecting each, wherein the plurality of first grooves and the plurality of second grooves intersect each other, each of the plurality of first grooves is open at a front surface and extends to a bottom, and a curvature at a bottom surface of the deeper depth groove is larger than a curvature at a bottom surface of the shallower depth groove.

2. The timepiece component according to claim 1, wherein

"A" is a width of each of the plurality of first grooves,

"B" is depth of each of the plurality of first grooves, and

0<B≤6×A.

3. The timepiece component according to claim 1, wherein the plurality of first grooves are orthogonal to the plurality of second grooves.

4. The timepiece component according to claim 1, wherein each of the plurality of first grooves has a constant first width at the front surface, the plurality of first grooves have a constant first pitch interval between adjacent bottoms of the plurality of first grooves;

each of the plurality of second grooves has a constant second width at the front surface; and the plurality of second grooves have a second constant pitch interval between adjacent bottoms of the plurality of second grooves.

5. The timepiece component according to claim 1, further comprising:

a plurality of third grooves formed in the surface, the plurality of third grooves not intersecting each other, wherein the plurality of first grooves, the plurality of second grooves, and the plurality of third grooves intersecting each other, first angles are formed by the intersection of the plurality of first grooves and the plurality of second grooves, second angles are formed by the intersection of the plurality of second grooves and the plurality of third grooves, third angles are formed by the intersection of the plurality of third grooves and the plurality of first grooves, and the first, second and third angles are each 60°.

6. The timepiece component according to claim 1, wherein a material of the substrate is any one of brass, pure iron, stainless steel, and nickel silver.

7. The timepiece component according to claim 1, wherein a metal film is provided on the surface of the base material.

8. The timepiece component according to claim 1, wherein the plurality of first grooves and the plurality of second grooves are formed by a laser beam.

9. A timepiece movement comprising the timepiece component according to claim 1.

10. A timepiece comprising a timepiece movement according to claim 9.

* * * * *